Patented Nov. 26, 1929

1,737,006

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

SUSPENSION COMPOSITION

No Drawing.  Application filed February 28, 1925. Serial No. 12,359.

This invention relates to a composition comprising a suspension of a water-insoluble metallic soap such as calcium stearate, zinc stearate, aluminum palmitate and the like and to the process of making such composition.

For certain purposes there is desired a means of mixing a water-insoluble metallic soap in materials which are moist as for example in the waterproofing of Portland cement. In this case 2 or 3 per cent of for example calcium stearate based on the amount of neat cement employed is added to the cement or concrete material. Difficulty arises in distributing the calcium stearate uniformly through the composition owing to its water-repellent character. Thus it may readily float about and collect in the material at points where a greater proportion of water is present. In the present invention a composition is produced which contains the metallic soap in suspension in a finely divided, and possibly in some cases, slightly colloidal condition enabling a uniform distribution through the moist material to which it is desired to be added. In like manner the composition of the present invention may be applied to damp or wet surfaces without the difficulty which would be encountered through lack of uniformity of spreading when the dry metallic soap by itself is employed. A suspension made in accordance with the present invention is prepared by agitating preferably by grinding in a ball mill the desired amount of the metallic soap with preferably a much smaller amount of a colloidal clay such as bentonite and a quantity of water sufficient to make a paste or cream. The agitation and grinding is maintained for a time sufficient to yield a good suspension. The temperature may be ordinary room temperature or higher or lower temperatures may be employed. While water is the preferred suspending medium it should be understood that I do not preclude the addition of substances such as glycerol, glue, gelatin, gum tragacanth and the like. Ordinarily however the bentonite or other colloidal clay is employed without incorporation of such other substances.

For example 45 parts by weight of zinc stearate, 5 parts of bentonite and 300 parts of water are ground in a ball mill for an hour or longer until a good creamy suspension results. On standing this will show signs of water separating at the bottom and eventually after standing for several days a layer of water, possibly one-fourth to one-fifth the total volume of the suspension, will collect at the bottom. If desired this may be drawn off and a soft paste or thick white creamy composition thus is obtained.

By using less water a heavier bodied paste will result but I prefer to employ slightly more water than the ultimate composition requires in order to secure a more satisfactory grinding effect.

By varying the proportion of bentonite the amount of water, consistency of the suspension and other properties may be varied.

Such a composition containing the zinc stearate may be employed for cosmetic purposes. Waxes and other substances, emollients and the like may be incorporated.

For waterproofing concrete calcium stearate is preferred and may be obtained in the form of an emulsion in like manner. For purposes of shipment the amount of water should be reduced to a minimum consistent with ease of mixing. Hence the paste may be made up with a minimum amount of water or an excess of water used and some portion of it removed subsequently by settling, centrifuging, evaporation etc.

For use to incorporate with paper pulp in making a water resistant paper, pressboard and the like I may prepare the composition in a similar manner and apply it to the paper pulp for example by spraying the suspension on to the pulp in the paper machine so that as the paper is building up in thickness each course or layer of the pulp receives a spraying of the calcium stearate or whichever metallic soap is employed. Or one or more layers of the paper, either those at the surface or interior ones may be treated in like manner. The exact procedure of course will depend upon the thickness of the paper or pressboard which is being formed as well as other conditions.

The employment of other waterproofing agents such as waxes, asphalts, gilsonite, pitches, resins, resin soaps such as calcium or aluminum resinate in the foregoing composition is not precluded. In some cases water-insoluble metallic resinates may be used in lieu of the metallic soaps illustrated above.

I do not wish to limit myself to any particular metallic soap but may use any of those which are appropriately water-resistant and mixtures of two or more soaps may be employed if desired. Neither is the addition of water soluble soaps such as sodium or potassium oleate or stearate precluded where such addition yields a product especially adapted for certain applications.

It should be noted that when water-insoluble metallic soaps in powdered form are stirred in water they repel the water and form a film of the powder on the surface, and even though stirred for a long period the metallic soap and water will not mix or form any suspension. In the present case by grinding the metallic soap in an aqueous medium, that is one containing water or consisting largely of water, in the presence of a suspensory agent, illustratively bentonite, a suspension of creamy to pasty consistency may be obtained in which the metallic soap is well distributed, instead of separating from the water as a water-repellent film. By means of such a suspension it is possible therefore to distribute a metallic soap in an aqueous medium so that it may be spread through a mass of material or over a surface in a manner which would be quite impossible were the metallic soap and water simply mixed together and applied without conversion to a suspension.

Instead of mixing dry metallic soap with water and the colloidal clay or other appropriate dispersing medium I may add, for example, bentonite to a solution in water of ordinary chip soap, laundry soap containing rosin or other suitable water-soluble soap, then add a precipitating agent such as a solution of calcium, magnesium or barium chloride, zinc sulphate, aluminum sulphate, soluble salts of iron, chromium etc., in order to precipitate the water-insoluble metallic soap admixed with bentonite. The curd or precipitate may be washed to remove soluble salts and water added to the wet mass without any intermediate drying. This product is then ground as described above for the purpose of securing a more perfect colloidal suspension than that obtained with the dry powdered metallic soap. Also it is possible to carry out the precipitation as above without the presence of bentonite and without drying the precipitate, incorporate with bentonite and water and grind or subject to any other appropriate vigorous mechanical agitation or attrition capable of securing an adequate dispersion of the wet metallic soap.

The invention also comprises permeable or porous material such as paper, cloth, leather, concrete and the like waterproofed by dispersed water-insoluble metallic soaps such for example as compositions prepared in accordance with the foregoing.

What I claim is:—

1. A suspension in an aqueous vehicle comprising a water-insoluble soap and a colloidal clay of the bentonite type having the property of maintaining said water-insoluble soap in appropriate suspension.

2. The process of making a suspension of a water-insoluble metallic soap which comprises grinding said soap in water in the presence of bentonite.

3. In an aqueous suspension comprising collodial clay of the bentonite type, a water insoluble soap ordinarily repelling water and in the powdered form forming a film of powder on the surface of the water even though stirred for a long period, said water insoluble soap being ground in contact with the bentonite and water, whereby a dispersion of creamy to pasty consistency is obtained in which the metallic soap is well distributed and does not separate from the water as a water-repellant film.

4. A suspension in water containing a water-insoluble metallic soap intimately incorporated with bentonite, both the soap and the bentonite existing, in said suspension, as finely pulverulent materials.

5. A suspension in water containing a water-insoluble metallic soap intimately incorporated with bentonite, said soap being present in amount substantially greater than said bentonite, both the soap and the bentonite existing, in said suspension, as finely pulverulent materials.

CARLETON ELLIS.